Feb. 15, 1927.
B. CHRISTIANSON
1,617,703
SELF ADJUSTING JAW BOLT TONGS
Filed Aug. 11, 1924
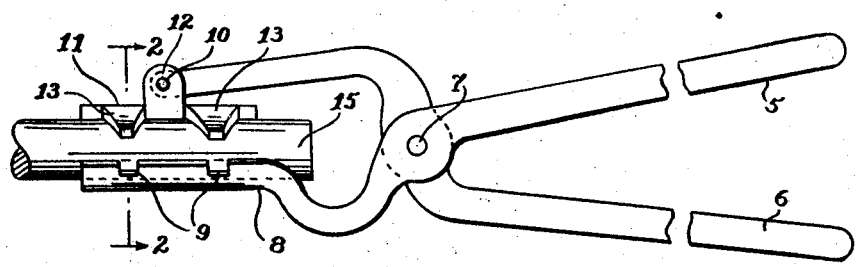
Fig.1.
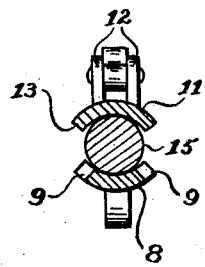   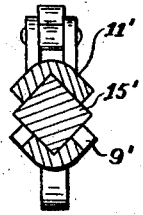
Fig.2.   Fig.4.
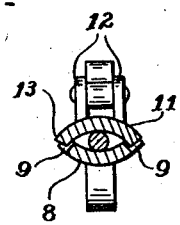
Fig.3.
INVENTOR
Bjorn Christianson
BY Ralph Burch
HIS ATTORNEY Patented Feb. 15, 1927.

1,617,703

UNITED STATES PATENT OFFICE.

BJORN CHRISTIANSON, OF LANGRUTH, MANITOBA, CANADA.

SELF-ADJUSTING JAW-BOLT TONGS.

Application filed August 11, 1924. Serial No. 731,392.

The object of my invention is to design a bolt tongs which will be self-adjusting and which will readily hold bolts of different diameter. As hitherto constructed both the jaws of bolt tongs have been rigidly connected to their handle and therefore did not readily adjust themselves to inequalities in the bolts to be gripped. The grip of such rigid jaws was consequently liable to slip in many cases. I overcome this difficulty in my invention by pivoting one of the jaws to its handle at a point midway the length of the jaw which is thus permitted to oscillate about its pivot and thereby adjust itself to the surface it is desired to grip. By a further improvement my tongs is designed to hold large or small bolts with equal security.

To the accomplishment of the above and related objects, my invention resides in the construction, combination and arrangement of the various cooperating elements and shall be hereinafter more fully described, illustrated in the accompanying drawing and pointed out in the claim hereunto appended.

In the accompanying drawings forming part of this specification—

Fig. 1 is a side elevation of my invention showing the tongs gripping a bolt or rod, Fig. 2 is a sectional view taken on line 2—2 Fig. 1, Fig. 3 is a similar view to Fig. 2 showing the jaws gripping a very small bolt, and Fig. 4 is a similar view to that shown in Fig. 2 but showing the jaws applied to a square bolt or rod.

My invention relates to bolt tongs and its object is to provide a device of this character which will have a more secure grip under all circumstances than those now in use and a further object is to provide a single tool which may be used to handle bolts having a wide range of diameters.

In the annexed drawings wherein similar numerals of reference designate similar parts, 5 and 6 are the handles of the tongs constructed as usual and pivoted together at 7. The handle 5 has constructed integrally therewith the concave jaw 8 having oppositely disposed notches 9 therein for a purpose hereinafter to be described. Pivotally connected to the free end of handle 6 by the pin 10 is the concave jaw 11 confronting the jaw 8 and adapted to grip therebetween the bolt or rod 15. The jaw 11 may be pivoted to its handle in any approved manner but as shown in the drawing I prefer to form the lugs 12 integral with the jaw 8 midway between the ends thereof. These lugs are bent upwardly and receive between them the free end of the handle 6. The pin 10 passes through perforations in the lugs and handle and thus permits the jaw 11 to oscillate freely.

This arrangement permits the jaw to accommodate itself to any irregularities in the bolt or rod to be held.

To adapt the device to hold bolts of various diameters one of the jaws is provided with notches. As shown in this drawing these notches 9 are provided in the rigid jaw but it will be readily understood that they may be made in the pivoted jaw if so desired. On the pivoted jaw opposite the notches 9 I provide the lugs 13 of a size to slide freely in the slots 9. These lugs 13 are integral with the jaw and are formed by cutting away the material of the jaw in any suitable manner. By this arrangement the lugs 13 register with the slots 9 and the jaws 8 and 11 overlap in the manner shown in Fig. 3 so that the jaws are enabled to grip a bolt of comparatively small diameter.

The modification shown in Fig. 4 is similar in all respects to that already described except that the jaws 9' and 11' are designed to conform to a rectangular shaped bolt 15'.

It is to be understood that I do not desire to be limited to the exact details here shown but consider myself entitled to protection on all forms of the device that fall within the scope of the appended claim.

What I claim as my invention and desire to secure by Letters Patent is:—

Bolt tongs comprising a pair of pivotally connected levers, an arcuate jaw formed integral with one of said levers, evenly spaced marginal notches cut in the sides thereof, a second arcuate jaw, of uniform thickness, confronting said integral jaw, spaced tapered fingers extending laterally from each side thereof and in continuation of the arcuate contour of said jaw, the outer ends of said fingers registering with and adapted to seat snugly in the marginal notches of said integral jaw when closed thereon and a pair of upturned lugs formed of the cut out parts, on opposite sides of said second jaw, between said spaced fingers, adapted to receive pivotally therebetween the adjacent end of the second of said pivotally connected levers.

In testimony whereof I hereby affix my signature.

BJORN CHRISTIANSON.